United States Patent
Hofmann et al.

(10) Patent No.: US 6,430,641 B1
(45) Date of Patent: Aug. 6, 2002

(54) METHODS, ARBITERS, AND COMPUTER PROGRAM PRODUCTS THAT CAN IMPROVE THE PERFORMANCE OF A PIPELINED DUAL BUS DATA PROCESSING SYSTEM

(75) Inventors: Richard Gerard Hofmann, Cary; Peter Dean LaFauci, Holly Springs; Dennis Charles Wilkerson, Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,939

(22) Filed: May 4, 1999

(51) Int. Cl.[7] .............................................. G06F 13/38
(52) U.S. Cl. ....................................... 710/240; 710/309
(58) Field of Search ................................. 710/240, 241, 710/242, 113, 119, 305, 306, 309

(56) References Cited

U.S. PATENT DOCUMENTS

| | | | |
|---|---|---|---|
| 5,265,211 A | * 11/1993 | Amini et al. .................. 710/36 |
| 5,345,566 A | * 9/1994 | Tanji et al. ................... 710/128 |
| 5,369,748 A | * 11/1994 | McFarland et al. .......... 710/126 |
| 5,386,517 A | * 1/1995 | Sheth et al. ................... 710/60 |
| 5,388,232 A | 2/1995 | Sullivan et al. .............. 395/325 |
| 5,469,577 A | * 11/1995 | Eng et al. ..................... 710/110 |
| 5,555,425 A | 9/1996 | Zeller et al. .................. 395/800 |
| 5,572,686 A | 11/1996 | Nunziata et al. ............. 395/296 |
| 5,708,784 A | 1/1998 | Yanai et al. .................. 395/299 |

* cited by examiner

*Primary Examiner*—Peter Wong
*Assistant Examiner*—X. Chung-Trans
(74) *Attorney, Agent, or Firm*—Myers, Bigel, Sibley & Sajovec, P.A.; Carlos Munoz-Bustamante

(57) ABSTRACT

Methods, arbiters, and computer program products determine if a request for an idle bus in a dual bus data processing system is being blocked by one or more pending requests for the other bus. In this circumstance, any such pending request for the other bus is masked by the arbiter so that the request for the idle bus can be granted. Consequently, a more efficient utilization of the dual bus architecture is achieved. In an illustrative embodiment, a bus request is received for a first one of the dual busses. If the address and control busses are unavailable to allow the request to be granted, then an inquiry is made regarding the status of a pending request for the second one of the dual busses that has gained control of the address and control busses. In particular, it is determined whether a primary request has been granted and a secondary request has been pipelined for the second one of the dual busses. If a primary request has been granted and a secondary request has been pipelined, then the priority of the pending requests for the second one of the dual busses are examined. If the priority of the pending requests for the second one of the dual busses are at least as high as the currently pending request for the first one of the dual busses, then these requests are masked so that they no longer appears to be pending, which allows the request for the first one of the dual busses to be granted.

15 Claims, 7 Drawing Sheets

METHODS, ARBITERS, AND COMPUTER PROGRAM PRODUCTS THAT CAN IMPROVE THE PERFORMANCE OF A PIPELINED DUAL BUS DATA PROCESSING SYSTEM

FIELD OF THE INVENTION

The present invention relates generally to the field of data processing systems, and, more particularly, to bus arbitration in dual bus data processing systems.

BACKGROUND OF THE INVENTION

Data processing systems may often be comprised of multiple components or devices that communicate with one another to carry out tasks. These components may be categorized as a master function or a slave function according to their operational characteristics in carrying out a particular objective. To facilitate data transfer or communication in a data processing system, busses may be used to carry data, address, and control information between master and slave functions. Because a data processing system may include several devices that assume the role of a master function at any point in time, contention for the use of one or more busses may arise.

To resolve a bus contention problem between two or more master functions, a bus arbiter can be used to arbitrate between simultaneous bus requests. The bus arbiter acts as a gatekeeper for a bus by accepting bus requests and then using a priority scheme to determine the order in which the requests will be granted. To ensure that high priority tasks are carried out promptly, the bus arbiter may use a priority scheme in which master functions attach a priority tag to their bus requests. Access to the bus is granted to the highest priority master function currently pending in a bus arbitration queue. As a result, bus performance is enhanced as the resource is allocated to those master functions implementing the highest priority tasks.

To further enhance the performance of a data processing system, the system busses may be duplicated into a simplex configuration for increased throughput. For example, a data bus may be divided into a write data bus for carrying data transfers from a master function to a slave function and a read data bus for carrying data transfers from a slave function to a master function. Thus, two data transfers can proceed simultaneously on the dual data busses as long as they do not access the same address location. The role of the bus arbiter becomes more complicated, however, as simultaneous requests for the data bus may both be granted if they are for different operations on separate address spaces. Clearly, more parallel data transfers granted by the bus arbiter will result in better utilization of the dual bus architecture and, ultimately, improved throughput.

Prior art arbiters implementing a priority based arbitration scheme for a dual bus system as described in the foregoing may suffer from a significant drawback. Consider the following sequence of events: The arbiter grants a request for a transaction on the read data bus, which is generally called the primary request. A subsequent request for the read data bus is acknowledged by the arbiter and is pipelined. This subsequent request is generally called the secondary request. If, the highest priority request currently held pending in a bus arbitration queue is for the read data bus, then a lower priority request for the write data bus will not be granted even if the write data bus is idle. Instead, the highest priority master function in the bus arbitration queue is given control of the address and control busses. Because the pending request for the write data bus is held in abeyance despite the availability of the write data bus to perform a data transfer, the utilization of the dual bus architecture is sub-optimal.

U.S. Pat. No. 5,572,686 to Nunziata et al., describes a priority based arbitration scheme in which a low priority master function can have its priority elevated if it does not receive access to a system bus within a certain period of time. Unfortunately, elevating the priority of the master function that made the request for the write data bus in the above example provides only a momentary solution to the problem. After this master function is assigned a higher priority, it may be the source of several requests to either the read or write data busses. One or more of these requests may end up as the highest priority request pending in a bus arbitration queue, which may block a lower priority master function from accessing the other, potentially idle, data bus. Thus, elevating the priority of a master function may simply move the problem from one master function to another.

U.S. Pat. No. 5,388,232 to Sullivan et al. and U.S. Pat. No. 5,555,425 to Zeller et al. describe bus arbitration schemes in which address and data transfers are pipelined to improve the utilization of the address and data busses. These patents do not, however, address the problem of arbitrating access to a dual bus system in which the data bus is divided into a simplex write data bus and a simplex read data bus as discussed in the foregoing.

U.S. Pat. No. 5,708,784 (hereinafter the '784 patent) to Yanai et al. describes a bus arbitration scheme for a dual, parallel bus architecture. The bus arbitration scheme discussed in the '784 patent, however, is directed to a dual bus architecture in which the address and data busses are fully duplicated with each having their own arbiter. For example, if a master function submits a request to a first arbiter for a first data bus that is currently busy, then the master function may submit the same request to a second arbiter to determine if a second data bus is available. If the second data bus is available, then the second arbiter will grant the request. The '784 patent does not, therefore, address the arbitration of a dual bus system in which the data bus comprises two simplex busses as discussed in the foregoing.

Consequently, there exists a need for improved arbiters and methods of arbitration for dual bus data processing systems in which a bus is divided into multiple busses based on function or other suitable criteria (e.g., read and write data busses).

SUMMARY OF THE INVENTION

It is therefore an object of the present invention to provide improved arbiters and methods of arbitration for dual bus data processing systems.

It is another object of the present invention to improve the utilization of a dual bus architecture.

These and other objects, advantages, and features of the present invention are provided by methods, arbiters, and computer program products that determine if a request for an idle bus in a dual bus data processing system is being blocked by one or more pending requests for the other bus. In this circumstance, any such pending request for the other bus is masked by the arbiter so that the request for the idle bus can be granted. Consequently, a more efficient utilization of the dual bus architecture is achieved.

In an illustrative embodiment of the invention, a bus request is received for a first one of the dual busses. If the address and control busses are unavailable to allow the request to be granted, then an inquiry is made regarding the status of a pending request for the second one of the dual busses that has gained control of the address and control busses. In particular, it is determined whether a primary request has been granted and a secondary request has been pipelined for the second one of the dual busses. If a primary request has been granted and a secondary request has been pipelined, then the priority of the pending requests for the second one of the dual busses are examined. If the priority of the pending requests for the second one of the dual busses are at least as high as the currently pending request for the first one of the dual busses, then these requests are masked so that they no longer appears to be pending, which allows the request for the first one of the dual busses to be granted.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
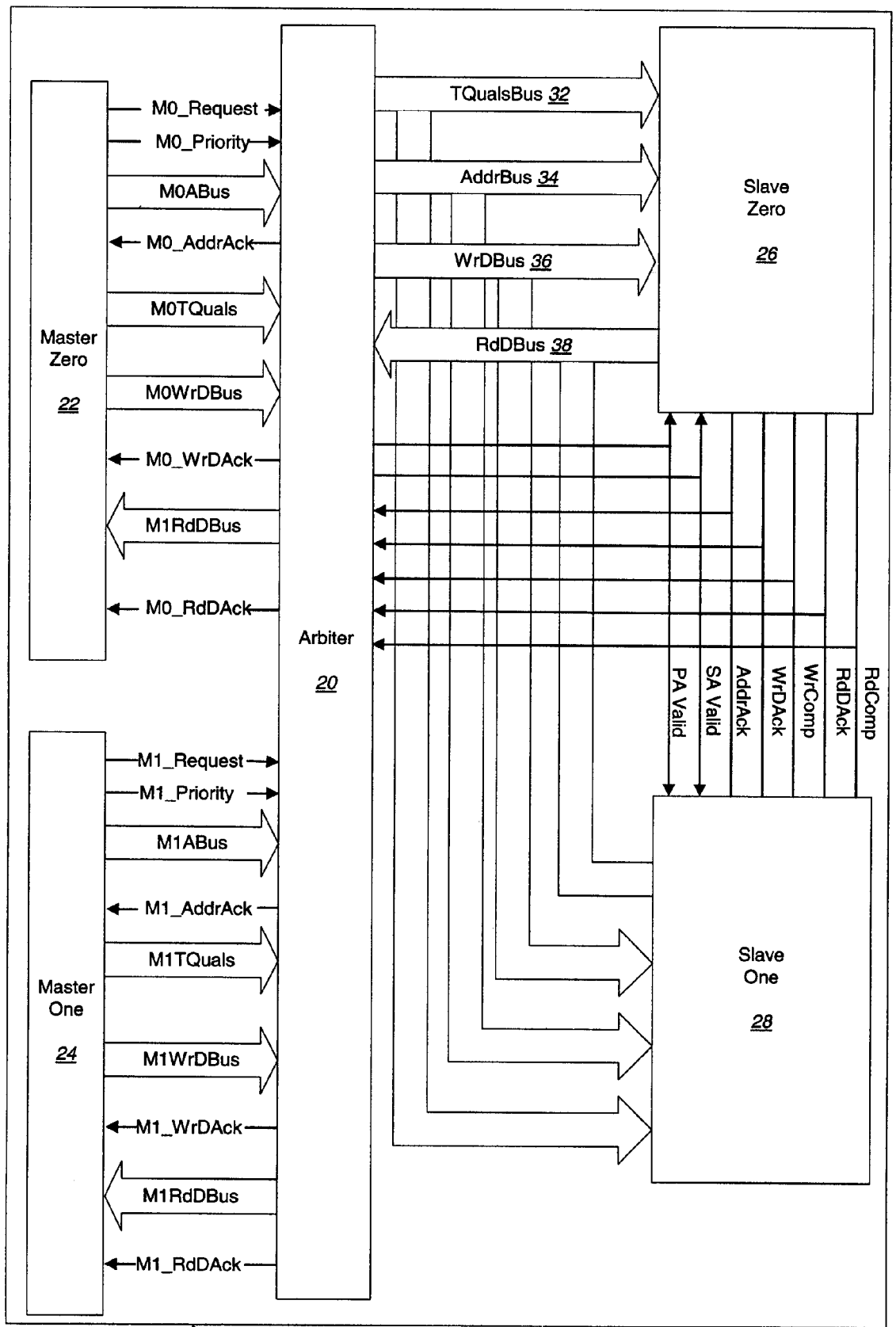
FIG. 1 is a block diagram that illustrates methods, arbiters, and computer program products that can improve the performance of a dual bus data processing system in accordance with the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention can be embodied as a method, arbiter (apparatus), or computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Referring now to FIG. 1, a dual bus data processing system 15, in accordance with the present invention, comprises an arbiter 20 that facilitates communication between one or more master functions 22, 24 and one or more slave functions 26, 28. Preferably, at least one master function 22, 24, one slave function 26, 28, and the arbiter 20 are contained within a single integrated circuit. More preferably, all master functions 22, 24, all slave functions 26, 28, and the arbiter 20 are contained within a single integrated circuit. For purposes of clarity and simplicity and in no way limited thereto, the data processing system 15 is shown as comprising two master functions 22, 24 and two slave functions 26, 28. It will be understood that the principles of the present invention are applicable to data processing systems using fewer or more master or slave functions.

Four busses are used for communication between the arbiter 20 and the slave devices 26, 28: a transfer qualifier (TQuals) bus 32, an address bus (AddrBus) 34, and a data bus, which is comprised of a write data bus (WrDBus) 36 and a read data bus (RdDBus) 38. All slave functions 26, 28 share these four busses in receiving information from and transferring information to the arbiter 20. More specifically, the transfer qualifier bus 32 is used to communicate information to the slave functions 26, 28 such as whether a particular transfer for which an address is present on the address bus 34 is a read or a write transfer, the size of the transfer, the type of the transfer (e.g., byte aligned, line, or burst), the priority or order of the transfer, speculative memory information, or other information about a particular transfer. The information provided through the transfer qualifier bus 32 allows multiple cycle transfers to be performed based upon a single address. For example, by providing an initial address to a slave function over the address bus 34 and providing the type of transfer and the number of bytes to be transferred to the slave function over the transfer qualifier bus 32, a block of data can be transferred to or from the slave function over multiple cycles on the data busses 36, 38 with only a single address placed on the address bus.

The address bus 34 communicates a particular address to the slave functions 26, 28, which is a target address for a transfer. The data bus is comprised of a write data bus 36, which transfers information from the arbiter 20 to the slave functions 26, 28 and a read data bus 38, which transfers information from the slave functions 26, 28 to the arbiter 20. The data processing system 15 thus uses a dual data bus architecture, which, in a preferred embodiment, uses a single address bus and a single control bus (e.g., transfer qualifier bus 32) to initiate data transfers and provides for simultaneous read and write data transfers to separate target locations.

The master functions 22, 24 each communicate with the arbiter 20 through a set of four busses that correspond to the aforementioned busses connecting the slave functions 26, 28 to the arbiter 20. Each master function uses an address bus (MXAbus), a transfer qualifier bus (MXTQuals), a write data bus (MXWrDBus), and a read data bus (MXRdDBus) to transfer information to and from the arbiter 20. To associate a particular bus with a particular master function 22, 24, the bus name is preceded with a master function identifier MX, where X corresponds to the master function number. The address bus (MXAbus) and the transfer qualifier bus (MXTQuals) are used to transfer a particular slave address and transfer qualifier information from the associated master to the arbiter 20. The data bus between a master function 22, 24 and the arbiter 20 comprises a dual bus architecture consisting of a write data bus (MXWrDBus) and a read data bus (MXRdDBus), which, in a preferred embodiment, uses a single address bus (e.g., MXAbus) and a single control bus (e.g., MXTQuals) to initiate data transfers and provides for simultaneous read and write data transfers to separate target locations.

In addition to the system busses described in the foregoing, the data processing system 15 includes several signal lines connecting each master function 22, 24 to the arbiter 20 and connecting the slave functions 26, 28 to the arbiter 20. These signals are defined as set forth below:

Master Function—Arbiter Signals

MX_Request

This signal is asserted by a master function to indicate to the arbiter 20 that the master function wishes to initiate a data transfer. Once asserted, the MX_Request signal and all of the transfer qualifiers should retain their values until the targeted slave function has acknowledged the requested address.

MX_Priority

This signal is used to indicate to the arbiter 20 the priority of the master function's request. The arbiter 20 uses this signal in conjunction with the priority signals from other master functions to determine which request should be granted. A fixed priority level can be assigned to each master function 22, 24 to allow the arbiter 20 to choose between master functions asserting a request with the same priority signal (MX_Priority). In a preferred embodiment, the number assigned to the master function (e.g., master zero, one, etc.) is used as the fixed priority level. Furthermore, a preferred embodiment uses two bits to define four priority levels in which 11 is the highest priority level, 10 is the next highest, 01 is the next highest, and 00 is the lowest priority level.

MX_AddrAck

This signal is asserted to inform a master function that a slave function has recognized an address on the address bus 34 and will latch the address and all of the transfer qualifiers at the end of the current bus cycle.

MX_WrDAck

This signal is used to inform a master function that the data for a current write operation is no longer required by the target slave function. That is, the slave function has either already latched the data or will latch the data at the end of the current bus cycle.

MX_RdDAck

This signal is used to inform a master function that the data is valid on the MXRdDBus and should be latched by the master function at the end of the current bus cycle.

Slave Function—Arbiter Signals

PAValid

This signal is asserted by the arbiter 20 in response to the assertion of an MX_Request signal to inform a slave function that there is a valid address and transfer qualifiers on the address bus 34 and transfer qualifier bus 32 respectively. This signal is asserted for a primary request, which means that there is no transfer currently in progress for the requested data bus.

SAValid

This signal is asserted by the arbiter 20 in response to the assertion of an MX_Request signal to inform a slave function that there is a valid address and transfer qualifiers on the address bus 34 and transfer qualifier bus 32 respectively. This signal is asserted for a secondary request, which means that there is another transfer currently in progress for the requested data bus.

AddrAck

This signal is asserted to inform the arbiter 20 that a slave function has recognized an address on the address bus 34 and will latch the address and all of the transfer qualifiers at the end of the current bus cycle.

WrDAck

This signal is used to inform the arbiter 20, which then informs a master function through the MX_WrDAck signal, that the data for a current write operation is no longer required by the target slave function. That is, the slave function has either already latched the data or will latch the data at the end of the current cycle.

WrComp

This signal is used to inform the arbiter 20 that a write operation is complete and that all of the data has been latched by the target slave function.

RdDAck

This signal is used to inform the arbiter 20, which then informs a master function through the MX_RdDAck signal, that the data is valid on the MXRdDBus and should be latched by the master function at the end of the current cycle.

RdComp this signal is used to inform the arbiter 20 that a read operation is either already complete, or will be complete by the end of the next bus cycle.

Note that in a preferred embodiment of the present invention the signals used for communication between the slave functions 26, 28 and the arbiter 20 use shared or common signal lines rather than a set of dedicated signal lines for each slave function 26, 28. The following naming convention is used to clarify the source of an assertion of one of these signal lines: SLX_signal where X corresponds to the number of the slave function asserting the signal line.

The present invention is described hereinafter with reference to flowchart illustrations of methods, arbiters (apparatus), and computer program products according to an embodiment of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

As explained hereinbefore, prior art dual bus data processing systems implementing a priority based arbitration scheme may deny a request for either the write data bus 36 or the read data bus 38, even though the requested bus is idle, because of a higher priority pending request for the other data bus. The present invention overcomes this problem as described hereafter with reference to FIGS. 2, 3A–3B, 4, and 5A–5B.

Figure 2:
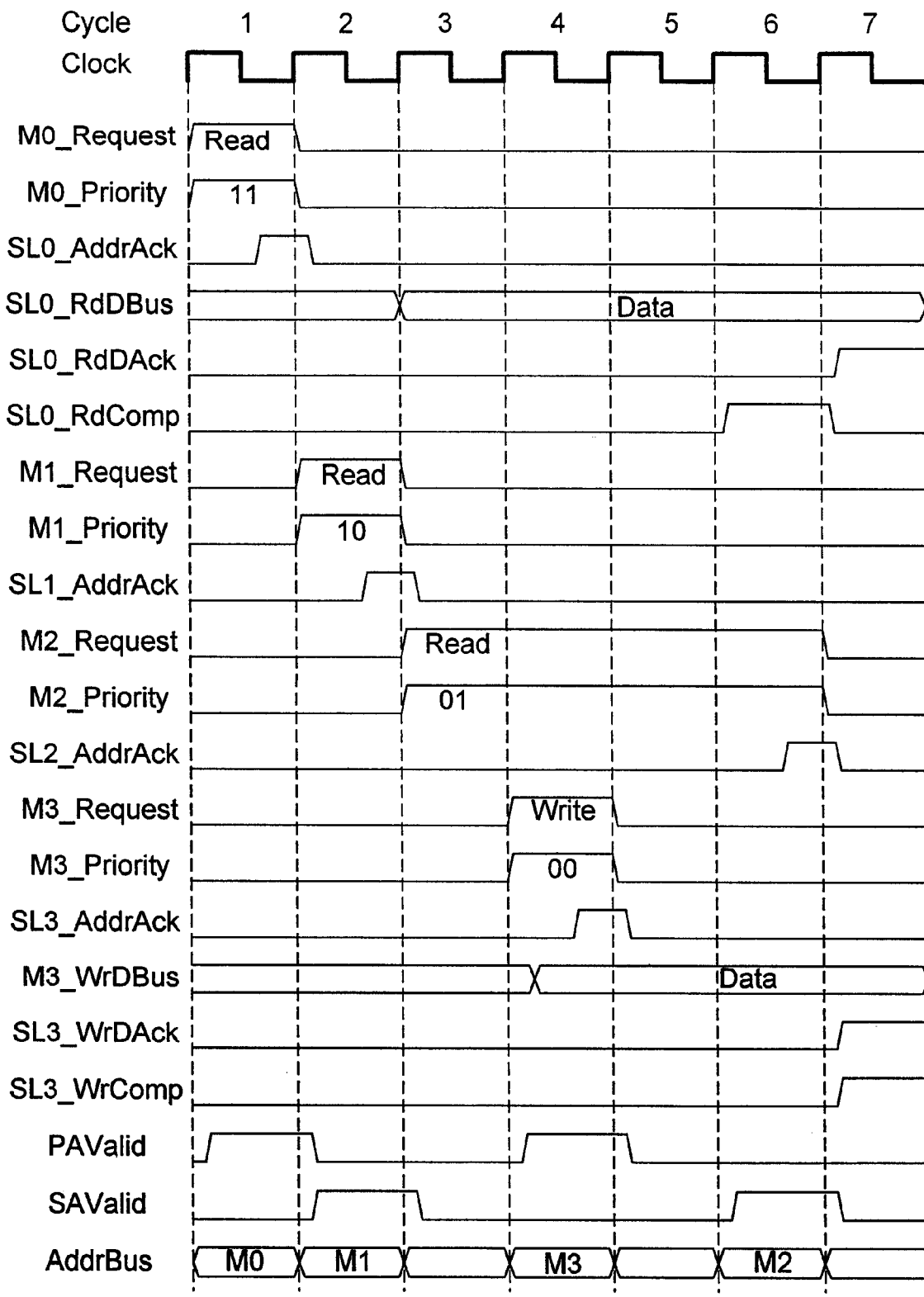
FIG. 2 is a signal timing diagram for the methods, arbiters, and computer program products of FIG. 1.

FIG. 2 illustrates a signal timing diagram for a sequence of successive read requests followed by a write request. In clock cycle one, a read request is made by a master function M0. This event is signified by the assertion of the M0__Request signal along with the M0__Priority signal. Note that the read request is made with a priority of 11, which is the highest priority level. Because no other master function is currently using the read data bus 38, the arbiter 20 asserts the PAValid signal to notify the target slave function that a valid address is available for a primary request. The master function M0 communicates the address to the arbiter 20 using the M0Abus, which the arbiter 20 then places on the address bus 34 as represented by the M0 designation on the AddrBus in the signal diagram. In the example shown, the read request is destined for slave function SL0, which acknowledges the requested address placed upon the address bus 34 by asserting the SL0__AddrAck signal. It should be understood that FIG. 2 does not illustrate all signals or bus transactions that may take place for the events shown (e.g., the transfer qualifier bus 32 is not illustrated). Instead, emphasis is placed upon those signals that best depict the occurrence of the various events and are used in a preferred embodiment of the present invention.

In clock cycle two, a second read request is made by master function M1 with a priority of 10, which is one priority level below the read request made by master function M0. Because the arbiter 20 has already granted a primary request for M0 on the read data bus 38, the arbiter 20 asserts the SAValid signal to notify the target slave function that a valid address is available for a secondary request. The master function M1 communicates the address to the arbiter 20 using the M1 Abus, which the arbiter 20 then places on the address bus 34 as represented by the M1 designation on the AddrBus in the signal diagram. In the example shown, the read request is destined for slave function SL1, which acknowledges the requested address placed upon the address bus 34 by asserting the SL1__AddrAck signal. The read request made by the master function M1 is not able to complete until the primary request made by master function M0 completes. Nevertheless, the read request made by the master function M1 is pipelined as a secondary read request, which will become a primary request once the read request by the master function M0 completes.

In clock cycle three, the transfer of data in response to the read request by master function M0 commences on the read data bus 38. In addition, a third read request is made by a third master function M2, which is one priority level below the read request made by master function M1. Because a primary read request (M0 request) is currently in progress and a secondary read request (M1 request) has already been pipelined (i.e., acknowledged by the target slave function through assertion of the SL1__AddrAck signal), the arbiter 20 will not grant the request from the master function M2. The request, therefore, remains pending in an arbitration queue that holds requests for the read data bus 38 that cannot currently be granted primary or secondary status. As shown in FIG. 2, the M2__Request and M2__Priority signals are asserted through the sixth cycle at which time the slave function SL0 asserts the RdComp signal and then the RdDAck signal in the seventh cycle to indicate the completion of the read operation requested by the master function M0. At that time, the arbiter 20 asserts the SAValid signal to notify the target slave function that a valid address is available for a secondary request. The master function M2 communicates the address to the arbiter 20 using the M2Abus, which the arbiter 20 then places on the address bus 34 as represented by the M2 designation on the AddrBus in the sixth cycle of the signal diagram. In the example shown, the read request is destined for slave function SL2, which acknowledges the requested address placed upon the address bus 34 by asserting the SL2__AddrAck signal in the sixth cycle.

Thus, in the example illustrated in FIG. 2, the read request made by the master function M2 is pipelined as a secondary request by the arbiter 20 in the sixth cycle because it is the highest priority read request currently pending in the arbitration queue. In prior art dual bus arbitration schemes, the pending read request made by the master function M2 has the effect of blocking any lower priority requests for the write data bus 36 even though the write data bus 36 is idle. That is, the highest priority pending master function request is given control of the address bus 34 and the transfer qualifier bus 32 even if that request is currently pending behind both a primary request and a secondary request for the same data bus. Thus, according to prior art dual bus arbitration schemes, the write request made by the master function M3 in the fourth cycle would not be granted but would instead be held pending in an arbitration queue because it has a lower priority than the read request made by master function M2, which is currently pending.

Figure 3A:
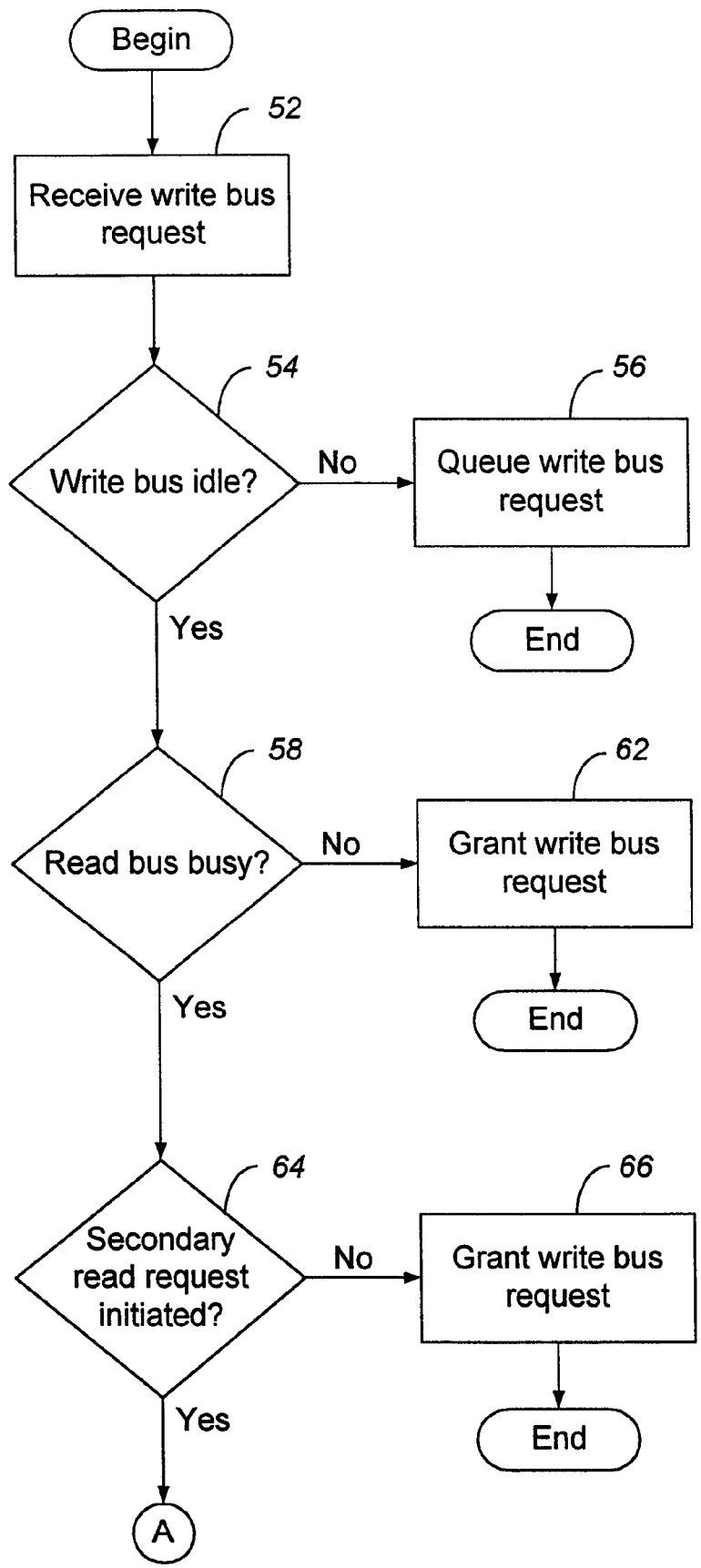
FIGS. 3A–3B are flow charts illustrating operations of the methods, arbiters, and computer program products of FIG. 1.
Figure 3B:
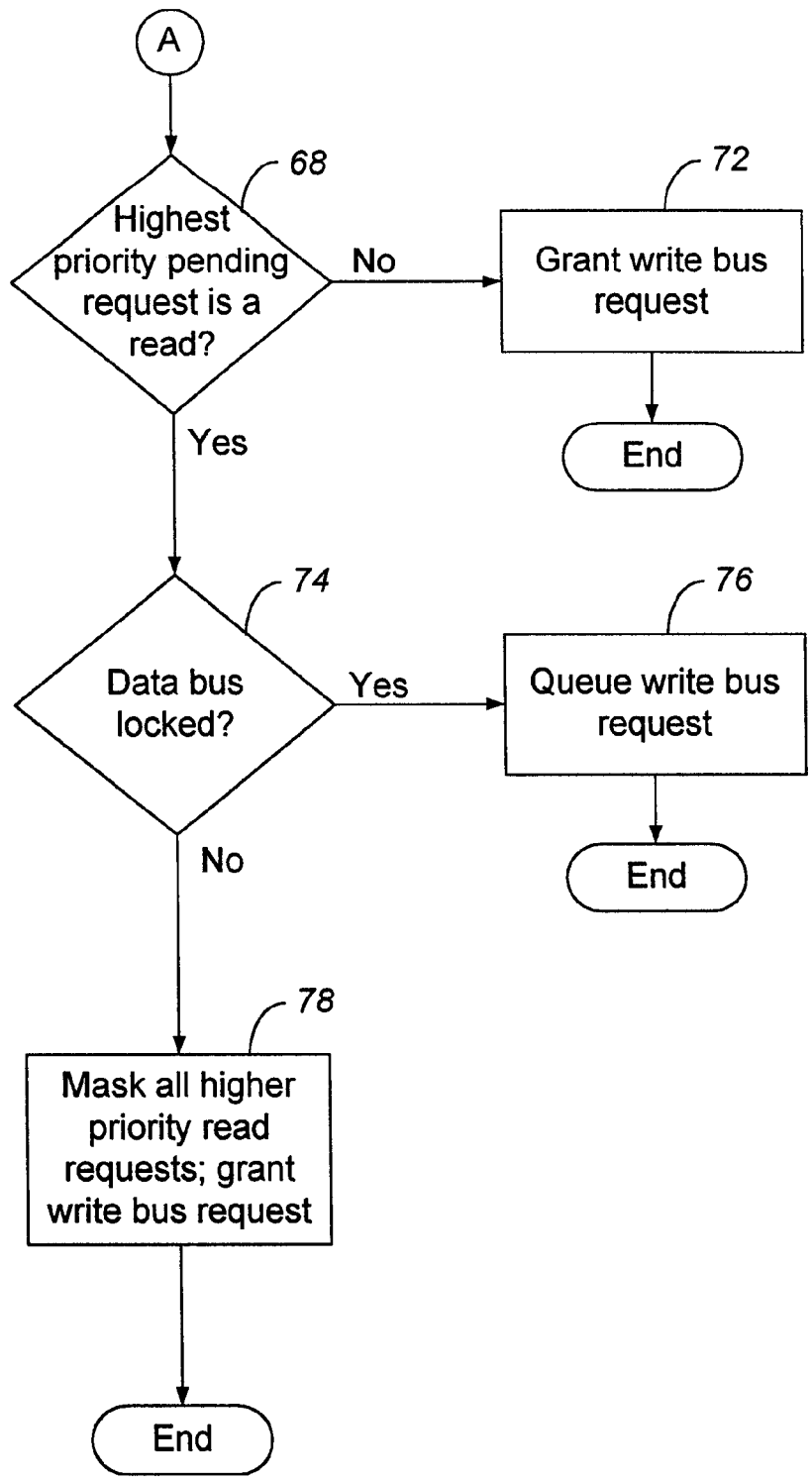

With reference to the flow charts of FIGS. 3A–3B and the timing diagram of FIG. 2, the arbiter 20, in accordance with the present invention, responds to the write request made by the master function M3 as described hereafter. Referring now to FIG. 3A, the arbiter 20 receives a request for the write data bus 36 at block 52. This is shown in FIG. 2 by the assertion of the M3__Request signal in the fourth clock cycle. A determination is made at block 54 whether the write data bus 36 is currently idle. If the write data bus 36 is busy, then the write request is queued by the arbiter 20 at block 56. Note that the write request could be pipelined instead of queued if a secondary request for the write data bus has not been acknowledged.

If the write data bus 36 is idle, then a determination is made at block 58 whether the read data bus 38 is busy. That is, has a primary request been acknowledged by a slave function for the read data bus 38. If the read data bus 38 is idle, then the request for the write data bus 36 is granted by the arbiter 20 at block 62. If, however, the read data bus 38 is busy with a primary read request, then a determination is made at block 64 whether a secondary read request for the read data bus 38 has been initiated (i.e., the arbiter 20 has asserted the SAValid signal) or, in other words, pipelined. If a secondary read request has not been pipelined, then the request for the write data bus 36 is granted by the arbiter 20 at block 66.

If a secondary read request has been pipelined, this corresponds to the example illustrated in FIG. 2 where the read request from master function M0 is acknowledged as a primary request and the read request from master function M1 is acknowledged as a secondary request. Following connector A to FIG. 3B, a determination is made at block 68 whether the highest priority pending request is a read request. If there is no pending read request that has a higher priority than the current request for the write data bus 36, then the request for the write data bus 36 is granted by the arbiter 20 at block 72. Otherwise, the highest priority request currently pending in the arbitration queue is a read request. This is illustrated in FIG. 2 in which the master function M2 makes a read request in the third cycle with a priority of 01, which is held pending because of the acknowledged primary and secondary read requests made by master functions M0 and M1 respectively, but has a higher priority than the write request made by the master function M3 in the fourth cycle.

In this circumstance, the arbiter 20 determines at block 74 whether the data bus (i.e., both the write data bus (WrDBus) 36 and the read data bus (RdDBus) 38) has been locked for exclusive use by one of the master functions to force the arbiter 20 to continue to grant the locked bus to that master function and ignore all other pending requests. In a preferred embodiment of the present invention, the entire data bus is locked and unlocked together. It is envisioned, however, that in alternative embodiments a master function may lock either the write data bus 36 or the read data bus 38 separately. If the data bus 36, 38 is locked, then the write request is queued by the arbiter 20 at block 76. Otherwise, the arbiter 20 masks all higher priority pending read requests to thereby grant the request for the write data bus 36 at block 78.

Figure 4:
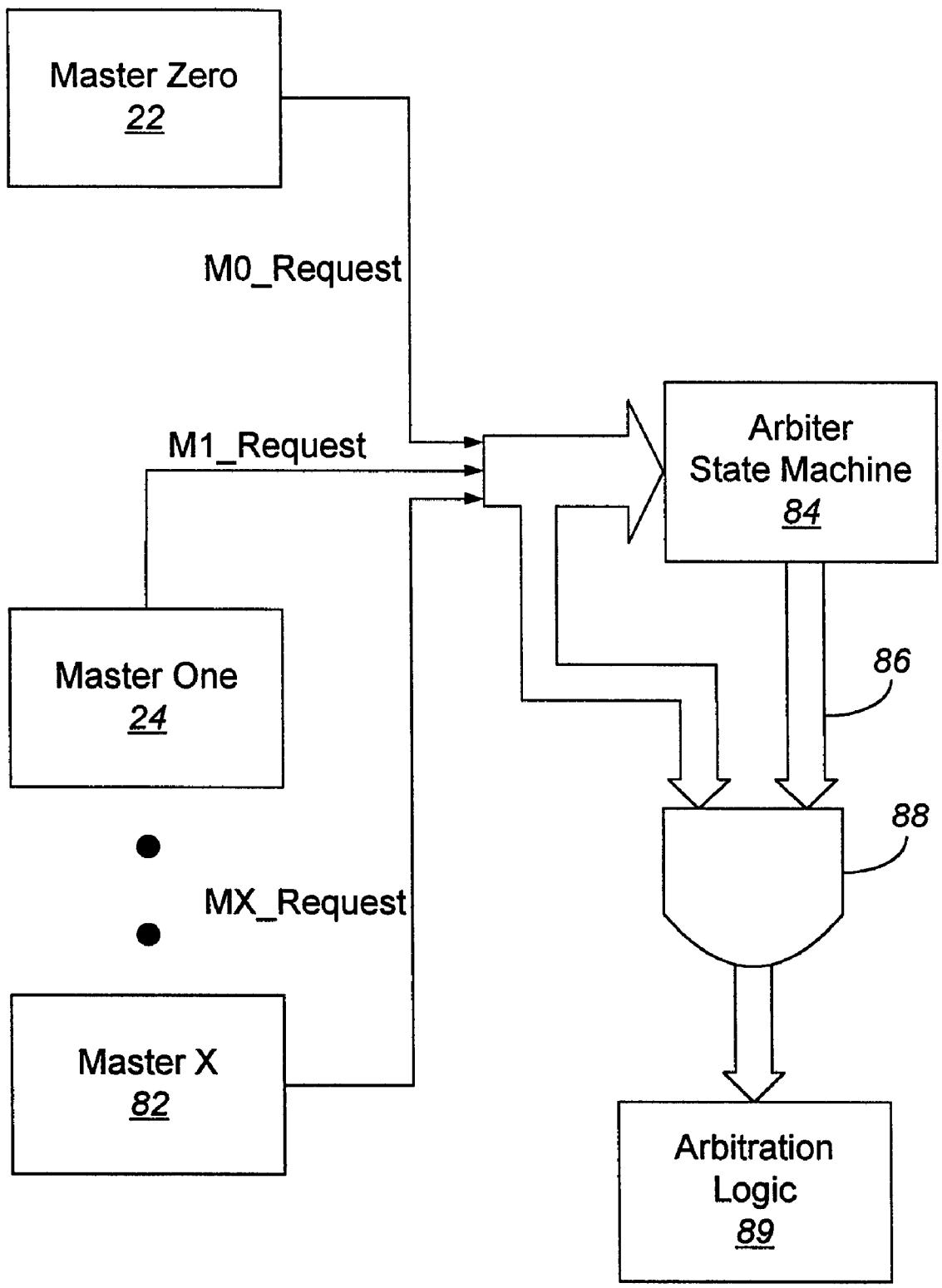
FIG. 4 is a more detailed block diagram illustrating the methods, arbiters, and computer program products of FIG. 1.

A more detailed illustration of the signals and components involved in masking the higher priority pending read requests is provided in FIG. 4. The request signals (M0_Request, M1_Request, and MX_Request) from the master functions zero 22, one 24, and X 82 are received by an arbiter state machine 84. The arbiter state machine 84 uses these request signals along with their associated request type (e.g., read or write), received as part of the transfer qualifier information, and state information for the write data bus 36 and the read data bus 38 (e.g., idle, primary request granted, or secondary request granted) to generate a mask vector 86. The request signals from the master functions 22, 24, and 82 are logically "anded" with the mask vector 86 in logic circuit 88. The output from logic circuit 88 is, therefore, a vector containing only those request signals the from master functions 22, 24, and 82 that were not masked off by the arbiter state machine 84 using the mask vector 86. Accordingly, the arbitration logic 89 determines which request to grant, if any, based on the request signals that have been passed through (i.e., not masked) by the logic circuit 88.

An example of a higher priority pending request being masked to allow a lower priority request access to the address bus (AddrBus 34) and control bus (TQualsBus 32) is illustrated in FIG. 2 where, at clock cycle four, the arbiter 20 grants the write request made by the master function M3 by masking the higher priority read request made by the master function M2. The master function M3 communicates the address to the arbiter 20 using the M3Abus, which the arbiter 20 then places on the address bus 34 as represented by the M3 designation on the AddrBus in the signal diagram. In the example shown, the write request is destined for slave function SL3, which acknowledges the requested address placed upon the address bus 34 by asserting the SL3_AddrAck signal. The arbiter 20 places data received from the master function M3 via the M3WrDBus on the write data bus 36 beginning in clock cycle four and continuing through clock cycle seven. During clock cycle seven, the slave function SL3 asserts the WrDAck signal and the WrComp to inform the master function M3 and the arbiter 20, respectively, that the write operation is complete.

Advantageously, the present invention provides a more efficient utilization of a dual bus architecture. As illustrated in FIG. 2, the arbiter 20 allows both a read transfer and a write transfer to proceed simultaneously in clock cycles four through seven. Prior art arbitration schemes held the write request by master function M3 in abeyance as long as a higher priority read request was currently pending behind a primary read request and a secondary or pipelined read request.

The present invention has been described herein as applied to a request for the write data bus 36 when a higher priority read request is currently pending behind a primary read request and a secondary read request for the read data bus 38. The principles of the present invention are equally applicable, however, when a request is made for the read data bus 38 and a higher priority write request is currently pending behind a primary write request and a secondary write request for the write data bus 36. This second application of the present invention is described hereafter with reference to FIGS. 5A–5B.

Figure 5A:
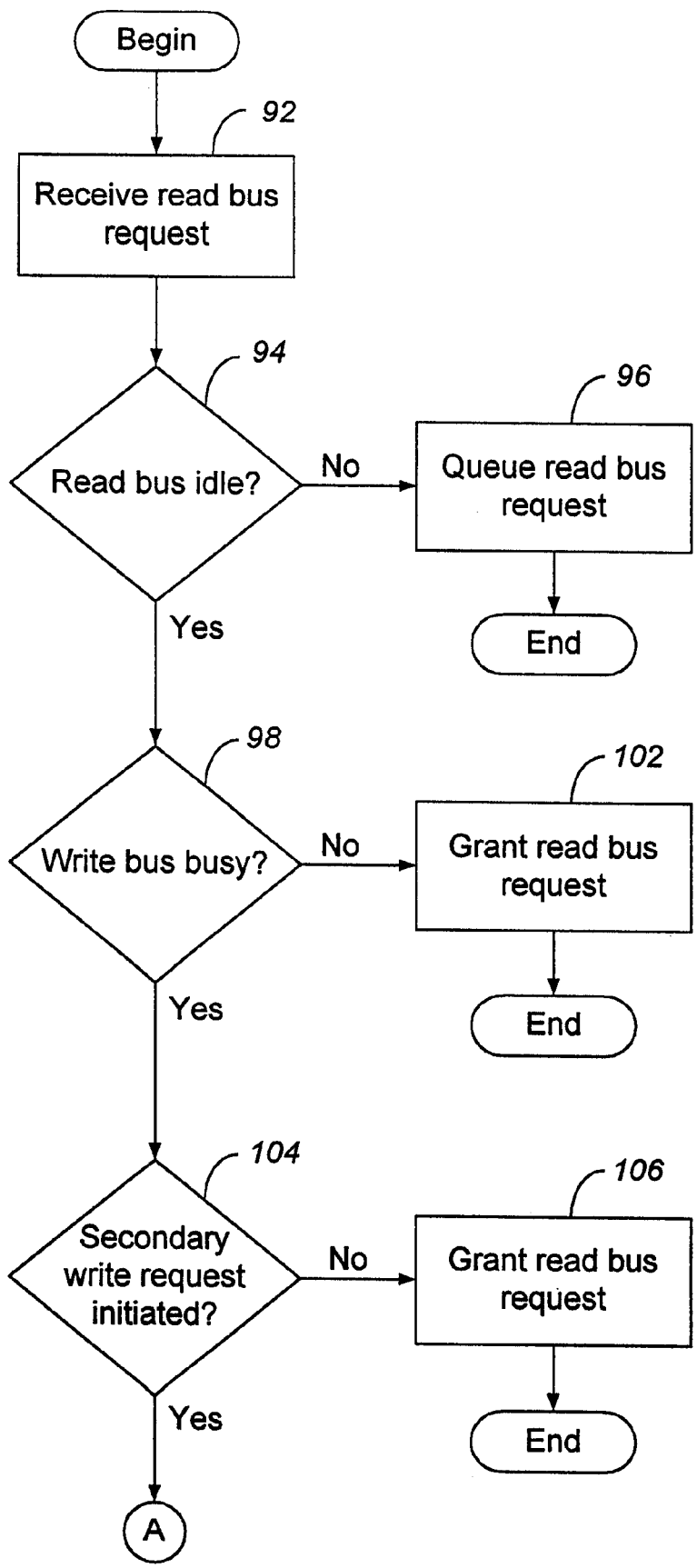
FIGS. 5A–5B are flow charts illustrating operations of the methods, arbiters, and computer program products of FIG. 1.

Referring now to FIG. 5A, the arbiter 20 receives a request for the read data bus 38 at block 92. A determination is made at block 94 whether the read data bus 38 is currently idle. If the read data bus 38 is busy, then the read request is queued by the arbiter 20 at block 96. Note that the read request could be pipelined instead of queued if a secondary request for the read data bus has not been acknowledged.

If the read data bus 38 is idle, then a determination is made at block 98 whether the write data bus 36 is busy. That is, has a primary request been acknowledged by a slave function for the write data bus 36. If the write data bus 36 is idle, then the request for the read data bus 38 is granted by the arbiter 20 at block 102. If, however, the write data bus 36 is busy with a primary write request, then a determination is made at block 104 whether a secondary write request for the write data bus 36 has been has been initiated (i.e., the arbiter 20 has asserted the SAValid signal) or, in other words, pipelined. If a secondary write request has not been pipelined, then the request for the read data bus 38 is granted by the arbiter 20 at block 106.

Figure 5B:
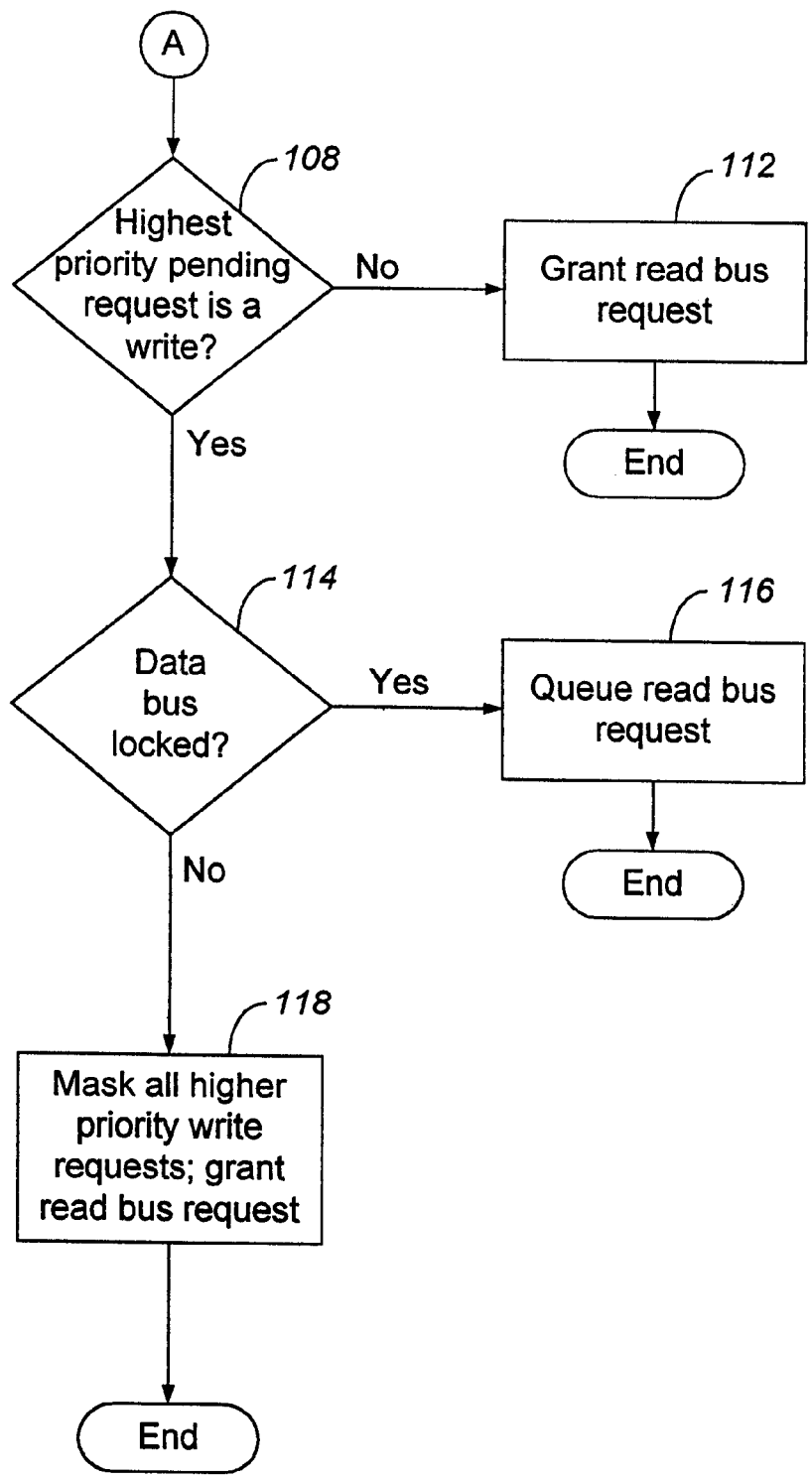

Following connector A to FIG. 5B, a determination is made at block 108 whether the highest priority pending request is a write request. If there is no pending write request that has a higher priority than the current request for the read data bus 38, then the request for the read data bus 38 is granted by the arbiter 20 at block 112. Otherwise, the highest priority request currently pending in the arbitration queue is a write request.

In this circumstance, the arbiter 20 determines at block 114 whether the data bus (i.e., both the write data bus (WrDBus) 36 and the read data bus (RdDBus) 38) has been locked for exclusive use by one of the master functions to force the arbiter 20 to continue to grant the locked bus to that master function and ignore all other pending requests. If the data bus 36, 38 is locked, then the read request is queued by the arbiter 20 at block 116. Otherwise, the arbiter 20 masks all higher priority pending write requests to thereby grant the request for the read data bus 38 at block 118.

The flow charts of FIGS. 3A–3B and 5A–5B show the architecture, functionality, and operation of a possible implementation of the present invention. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 3A–3B and 5A–5B. For example, two blocks shown in succession in FIGS. 3A–3B and 5A–5B may in fact be executed substantially concurrently or the blocks may sometimes be executed in the reverse order, depending upon the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of dual bus arbitration, comprising the steps of:
   receiving a bus request for a first one of the dual busses;
   receiving a priority associated with said bus request;
   determining if a primary request has been granted for the second one of the dual busses;
   determining if a secondary request has been pipelined for the second one of the dual busses; determining if the priority of the pending request is at least as high as any other pending request;
   masking at least one pending request for a second one of the dual busses; and
   granting the bus request for the first one of the dual busses.

2. A method as recited in claim 1, wherein the step of determining if a primary request has been granted comprises the steps of:
   transmitting a primary address valid signal to a slave function; and
   receiving, responsive to the transmitting step, an address acknowledgment from the slave function.

3. A method as recited in claim 1, wherein the step of determining if a secondary request has been pipelined comprises the step of transmitting a secondary address valid signal to a slave function.

4. A method as recited in claim 1, wherein the first one of the dual busses is a read data bus and the second one of the dual busses is a write data bus.

5. A method as recited in claim 1, wherein the first one of the dual busses is a write data bus and the second one of the dual busses is a read data bus.

6. A dual bus arbiter, comprising:
   arbitrating means for receiving a bus request for a first one of the dual busses;
   arbitrating means for receiving a priority associated with the bus request;
   arbitrating means for determining if a primary request has been granted for the second one of the dual busses;
   arbitrating means for determining if a secondary request has been pipelined for the second one of the dual busses;
   arbitrating means for determining if the priority of the pending request is at least as high as any other pending request;
   arbitrating means for masking at least one pending request for a second one of the dual busses; and
   arbitrating means for granting the bus request for the first one of the dual busses.

7. An arbiter as recited in claim 6, wherein the means for determining if a primary request has been granted for the second one of the dual busses comprises:
   arbitrating means for transmitting a primary address valid signal to a slave function; and
   arbitrating means for receiving, responsive to the means for transmitting, an address acknowledgment from the slave function.

8. An arbiter as recited in claim 6, wherein the arbitrating means for determining if a secondary request has been pipelined for the second one of the dual busses comprises means for transmitting a secondary address valid signal to a slave function.

9. An arbiter as recited in claim 6, wherein the first one of the dual busses is a read data bus and the second one of the dual busses is a write data bus.

10. An arbiter as recited in claim 6, wherein the first one of the dual busses is a write data bus and the second one of the dual busses is a read data bus.

11. A computer program product for arbitrating access to a dual bus system, comprising:
    a computer-readable storage medium having computer-readable program code logic embodied therein, the computer readable program code logic comprising:
    computer-readable program code logic for receiving a bus request for a first one of the dual busses;
    computer-readable program code logic for receiving a priority associated with the bus request;
    computer-readable program code logic for determining if a primary request has been granted for the second one of the dual busses;
    computer-readable program code logic for determining if a secondary request has been pipelined for the second one of the dual busses;
    computer-readable program code logic for determining if the priority of the pending request is at least as high as any other pending request;
    computer-readable program code logic for masking at least one pending request for a second one of the dual busses; and
    computer-readable program code logic for granting the bus request for the first one of the dual busses.

12. A computer program product as recited in claim 11, wherein the computer-readable program code logic for determining if a primary request has been granted for the second one of the dual busses comprises:
    computer-readable program code logic for transmitting a primary address valid signal to a slave function; and
    computer-readable program code logic for receiving, responsive to the computer-readable program code logic for transmitting, an address acknowledgement from the slave function.

13. A computer program product as recited in claim 11, wherein the computer-readable program code logic for determining if a secondary request has been pipelined for the second one of the dual busses comprises computer-readable program code logic for transmitting a secondary address valid signal to a slave function.

14. A computer program product as recited in claim 11, wherein the first one of the dual busses is a read data bus and the second one of the dual busses is a write data bus.

15. A computer program product as recited in claim 11, wherein the first one of the dual busses is a write data bus and the second one of the dual busses is a read data bus.

* * * * *